United States Patent
Turnbull et al.

(10) Patent No.: US 6,389,426 B1
(45) Date of Patent: May 14, 2002

(54) CENTRAL TROUBLE TICKET DATABASE AND SYSTEM AND METHOD FOR MANAGING SAME TO FACILITATE TICKETING, TRENDING, AND TRACKING PROCESSES

(75) Inventors: Andrew Turnbull; Sherman LaCost, both of Durham; Jeffrey Coburn, Cary, all of NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/248,522

(22) Filed: Feb. 9, 1999

(51) Int. Cl.[7] .............................................. G06F 17/30
(52) U.S. Cl. ...................... 707/102; 103/10; 709/223; 709/224; 379/201
(58) Field of Search ........................ 707/103, 10, 102; 705/1, 8; 379/201; 709/223, 224

(56) References Cited

U.S. PATENT DOCUMENTS

| | | | | |
|---|---|---|---|---|
| 4,464,543 A | * | 8/1984 | Kline et al. .................. 379/224 |
| 5,285,494 A | * | 2/1994 | Sprecher et al. ............ 455/423 |
| 5,937,048 A | * | 8/1999 | Pelle ........................... 379/201 |
| 5,958,010 A | * | 9/1999 | Agarwal et al. ............. 709/224 |
| 6,032,184 A | * | 2/2000 | Cogger et al. ............... 709/223 |
| 6,064,304 A | * | 5/2000 | Arrowsmith et al. ........ 340/506 |
| 6,064,723 A | * | 5/2000 | Cohn et al. ............... 379/88.14 |
| 6,131,112 A | * | 10/2000 | Lewis et al. ................. 709/207 |
| 6,134,318 A | * | 10/2000 | O'Neil ........................ 379/266 |
| 6,148,335 A | * | 11/2000 | Haggard et al. ............. 709/224 |
| 6,219,648 B1 | * | 4/2001 | Jones et al. ..................... 705/8 |

* cited by examiner

Primary Examiner—John Breene
Assistant Examiner—Debbie M Le

(57) ABSTRACT

System and method for managing the collection, trending, and tracking of trouble ticket data within a data processing environment. The system and method include and involve a central data storage facility for storing trouble ticket data including archival type data corresponding to customer support requests and inquiries according to a common data storage scheme, and a plurality of data processing systems coupled to the central data storage facility via a network system, etc. Each data processing system of the plurality of data processing systems is configured to facilitate collection, trending, and tracking processes related to the trouble ticket data stored in the central data storage facility via a graphical user interface configured in accordance with the common data storage scheme.

17 Claims, 7 Drawing Sheets

```
Trouble Ticket # : OH00076747  ~310
Severity : 3  ~312
Call Type : MCI:RE/IMAGE  ~313
Resolution Code :  ~315
Short Description : CUSTOMER REQUEST FOR INFORMATION ~314
Event Log :
        May 01, 1998  10:09:40 AM    bmccarthy
          Greg SA on site ( chi517s001 )
          Rescue Kit Mark Bolinski has requested a Kit for one of his people Gary Auxier ( who travels extensively )

Severity of: 3  ~312

Problem Assigned To:  OOC-MCI-EHD   Notified By: Phone

May 01, 1998  10:10;56 AM   bmccarthy
          Problem Assigned To:  OOC-MCI-LAN   Notified By: None May 05, 1998  3:00:49 PM    whytecl
          Spoke with Rob, we can send this user a Rescue Kit
          will confirm with Susan Mascour
          called S/A for shipping info
          left message Status Changed to: Monitor  ~318
```

316 brackets the Event Log section.

FIG. 3

| Trouble Ticket Number | Severity Level | Call/Ticket Type | Resolution Code | Short Description | Event Log Text | STATUS | ... |
|---|---|---|---|---|---|---|---|
| OH00076747 | 3 | MCI:RE/IMAGE | ND | CUSTOMER REQUEST FOR INFORMATION | <AS SHOWN IN FIG. 3> | MONITOR | ... |
| ... | ... | ... | ... | ... | ... | ... | ... |

FIG. 4

CENTRAL TROUBLE TICKET DATABASE AND SYSTEM AND METHOD FOR MANAGING SAME TO FACILITATE TICKETING, TRENDING, AND TRACKING PROCESSES

BACKGROUND OF THE INVENTION

1. Field of the Invention

The present invention relates to systems and methods that are used by help-desk and other organizational support personnel to produce, track, and perform trend analysis related to customer service requests and inquiries.

2. Description of the Related Art

In the past, call centers and other customer service centers providing help-desk and related services spent significant time and resources to produce accurate trouble tickets related to customer inquiries, to track such tickets and related data, and to perform trend analysis related to the same. The solutions presented to date to effectively manage and process customer support inquiries ran the gamut from manual ticket recording and processing schemes to elaborate and widely distributed automated systems.

Unfortunately, typical customer support ticketing, tracking, trending systems present serious and significant barriers to effective management control. Even worse, traditional systems do not lend themselves to central storage of customer service ticket data, effective and efficient analysis of such data, and easy tracking of the same. Such problems are exacerbated by the fact that many systems often involve disparate technologies and platforms that do not effectively communicate with each other. And, another frustration often realized is the fact that many systems are not well suited to particular customer service needs. As such, organizations involved in providing customer support oftentimes must spend significant time and resources to develop otherwise custom solutions and systems to service the needs of their customers.

To make matters worse, prior systems do not allow efficient and effective querying of older, archived trouble ticket data. In particular, organizations involved in providing customer support continue to have no effective way to query prior period trouble ticket data to drive trend analysis and corresponding resource allocation. As such, many organizations either over spend resources in efforts to review prior period trouble ticket data, or do not avail themselves of statistical data that can be used to streamline support processes and, ultimately, to save on resource expenditures.

An exemplary system in which trouble ticket data is generated according to the prior art is shown in a drawing figure attached hereto which has been identified as FIG. 1. In FIG. 1, a system 100 includes several trouble ticket repositories 102, 104, 106, and 108 which may be operated and managed by one or more organizations involved in the provision of customer support such as help-desk assistance and the like. Each trouble ticket repository (e.g., repository 108) has database management systems and/or other systems to facilitate generation, storage, and retrieval of trouble ticket data related to one or more customers. For example, it is quite common for a trouble ticket repository like repository 108 to include spreadsheets containing raw trouble ticket data.

Help-personnel and systems (designated as "HD") may access their respective trouble ticket repositories to access and retrieve local-type trouble ticket data. Unfortunately, however, because trouble ticket data stores often do not possess any consistent file structure, etc., significant time and resources have been spent querying the same to produce outputs such as statistical reports, etc. In fact, many organizations have had to employ special teams of personnel to manually sift through whole lengthy collections of raw data each time a customer or management organization seeks ticket response related information. As such, within the typical system depicted in FIG. 1, there is no way for an organization to globally analyze trouble ticket data over any particular period of time. Furthermore, as each repository system may service a different customer or user population, technology and platform differences often prevent distribution of data for global management review. And, as is often case, such localized repositories do not possess the resources to store trouble ticket data relative to a longer period of time to assist with trending and resource allocation. As a result, a system similar or like the one shown in FIG. 1 does not facilitate online storage and instant-access type retrieval of trouble ticket data to further facilitate organizational wide ticketing, trending, and tracking of customer service inquiries and needs.

Thus, there exists a need to provide new and improved systems and methods that will facilitate central storage of customer support ticket data and that will enable effective and efficient trend analysis and tracking. To be viable, such new and improved systems and methods must be easily configurable to suit a wide variety of customer needs and must be able to respond to management analysis requests without requiring significant system re-tooling. Such new and improved systems and methods must support (and include) modern data processing technologies including database management systems and networking environments.

SUMMARY OF THE INVENTION

The present invention solves the above-described problems associated with managing resources to facilitate ticketing, trending, and tracking of customer support inquiries. In particular, the present invention solves such problems by centrally storing trouble ticket data according to a common data storage scheme and by enabling remote access and query review of the same via efficiently deployable client and server technologies and systems. As such, the present invention now allows organizations involved in providing customer support to implement a client/server system provided by the present invention to facilitate centralized storage of trouble ticket data (including archival type data), trending processes related to the same, and tracking of customer service inquiries.

The present invention solves the aforementioned problems and delivers the above-stated benefits by providing systems and methods for managing the collection, trending, and tracking of trouble ticket data within a data processing environment. The systems and methods include and involve a central data storage facility for storing trouble ticket data including archival type data corresponding to customer support requests and inquiries according to a common data storage scheme and a plurality of data processing systems coupled to the central data storage facility via a network system, for example. Each data processing system of the plurality of data processing systems is configured to facilitate collection, trending, and tracking processes related to the trouble ticket data stored in the central data storage facility via a graphical user interface configured in accordance with the common data storage scheme.

BRIEF DESCRIPTION OF THE DRAWINGS

The present invention is described in detail below with reference to the following drawing figures, of which:

FIG. 3 is a sample trouble ticket that may be generated and processed within the system depicted in FIG. 2 in accordance with a preferred embodiment of the present invention;

FIG. 4 is a sample database management system table that may be used to centrally store trouble ticket data and to support trending and tracking processes related to such data in accordance with a preferred embodiment of the present invention;

DETAILED DESCRIPTION OF THE PREFERRED EMBODIMENTS

Figure 1:
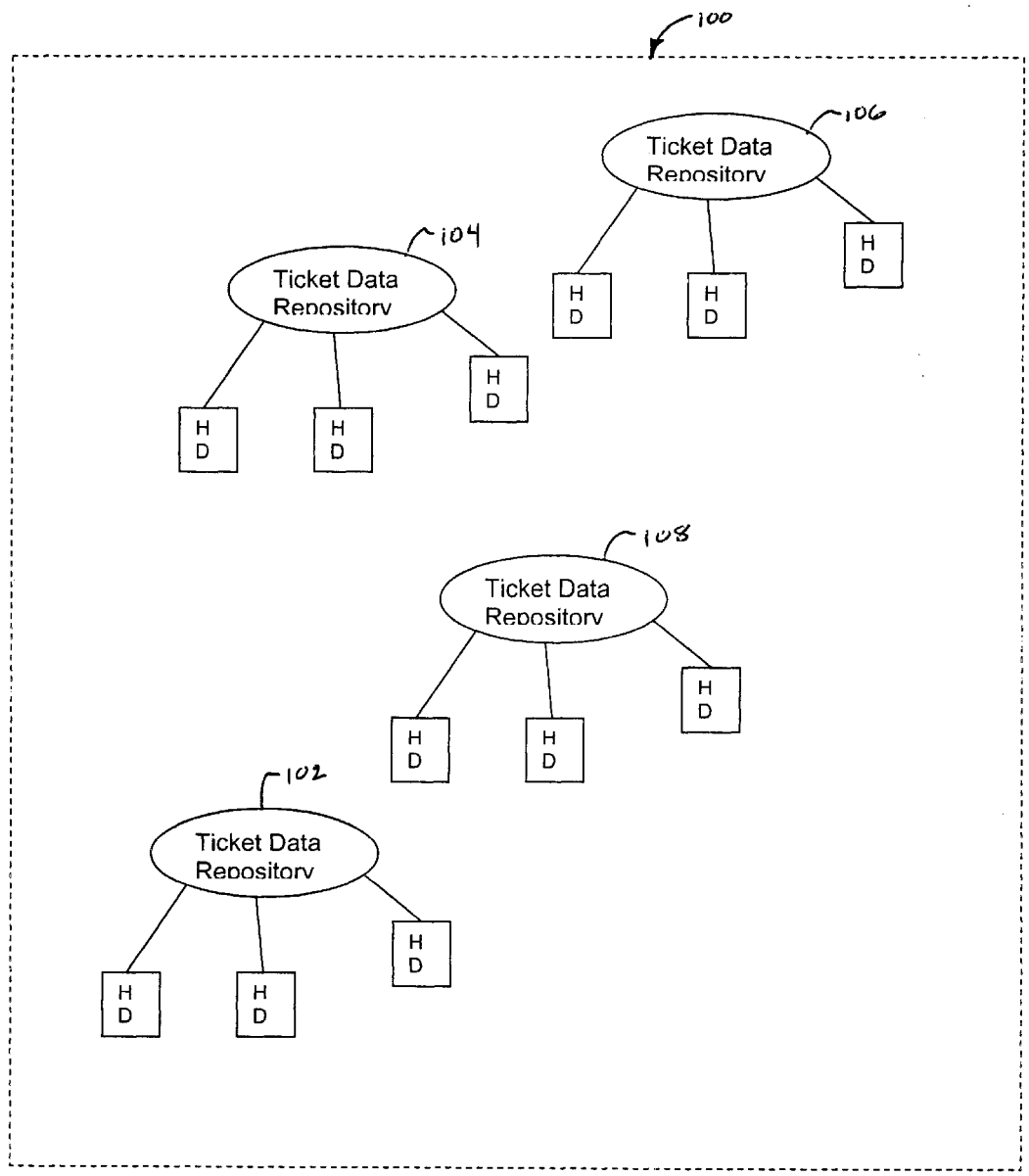
FIG. 1 is a diagram of a system in which customer trouble ticket data is stored and processed according to the prior art as was discussed in detail above.

The present invention is now discussed in detail with reference to the drawing figures that were briefly described above. Unless otherwise specified, like parts, systems, and processes are referred to with like reference numerals.

Figure 2:
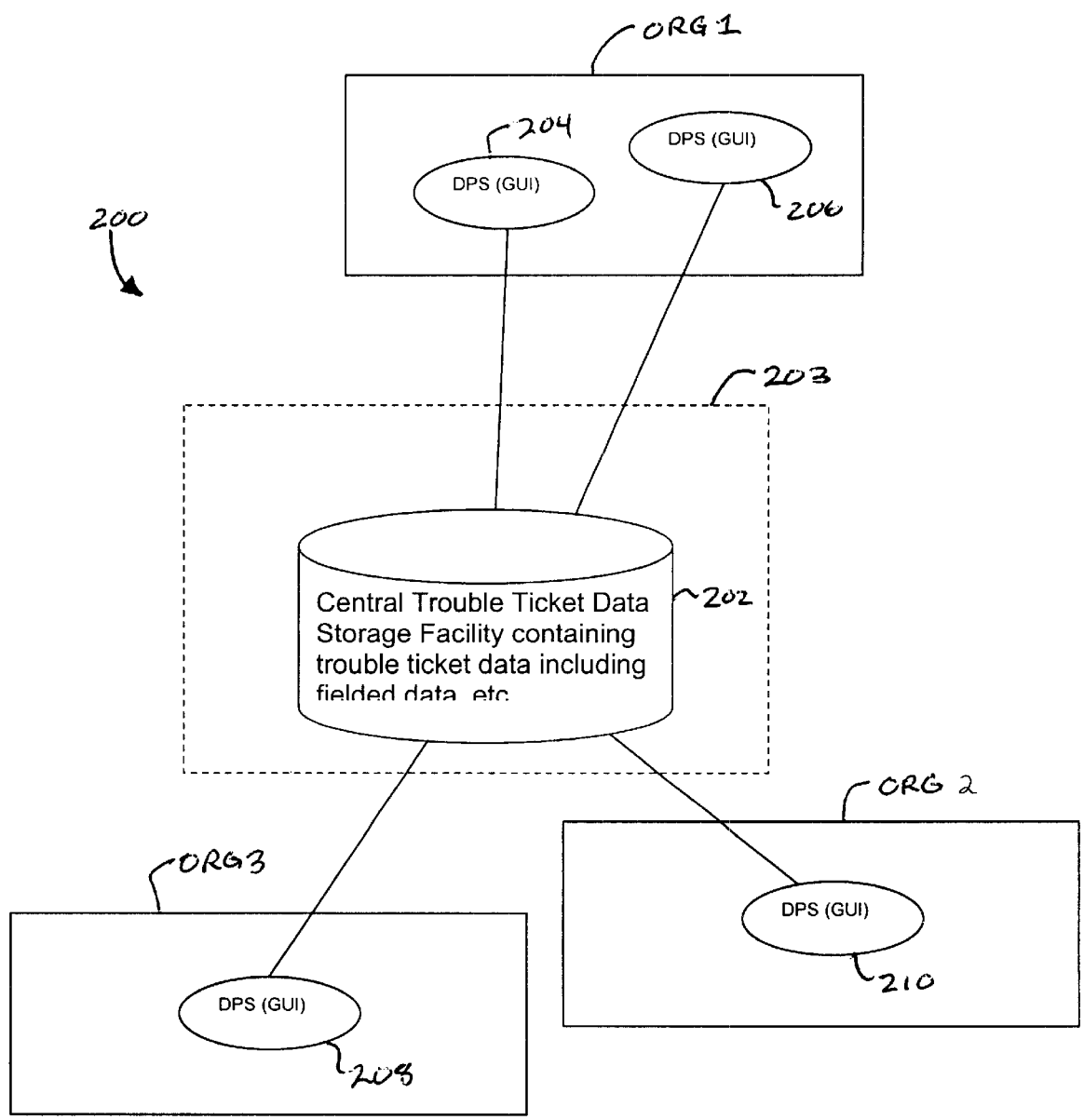
FIG. 2 is a diagram of a system in which customer trouble ticket data is centrally stored to facilitate ticketing, trend analysis, and tracking in accordance with a preferred embodiment of the present invention.

Referring now to FIG. 2, depicted therein is a system 200 in which trouble ticket data including archived trouble ticket data corresponding to customer inquiries and other requests may be centrally stored and accessed and processed by data processing systems which may be remotely located in a given data processing environment. Such systems may be deployed to facilitate ticketing, trending, and tracking of customer service inquiries and the like. In particular, system 200 includes a central trouble ticket data storage facility that may include database management system tables, etc., to store trouble ticket data corresponding to customer inquiries and the like. Such a central trouble ticket data storage facility 202 may be housed within a larger data processing environment 203 that has multiple data processing systems and which may be accessible via network connections such as via the Internet, etc. Central trouble ticket data storage facility 202 may include digital data stores such as magnetic disk arrays, optical storage media, etc.

Coupled to central trouble ticket data storage facility 202 are organizations 1–3 that may include data processing systems such as personal computing systems (terminal stations, etc.) 204, 206, 208, and 210. For example, a particular data processing systems such as data processing system 204 may be equipped with a personal computer such as a laptop computer outfitted to run the MICROSOFT WINDOWS OPERATING SYSTEM which is manufactured and marketed by MICROSOFT CORPORATION and appropriate database management software such as the MICROSOFT ACCESS 97 software package to facilitate data entry and graphical user interface access to database tables and file stores such as these maintained by central trouble ticket data storage facility 202.

Data processing system 204 (as with all other data processing systems provided in accordance with the present invention), supports Structured Query Language (SQL) queries against central trouble ticket data storage facility and tables maintained thereby. The generation of queries via a database front-end software system such as MICROSOFT ACCESS 97 in conjunction with an SQL server package maintained at central trouble ticket data storage facility 202 will be immediately understood by those skilled in the art.

Central trouble ticket data storage facility 202 may be implemented using a multi-user access data processing system such as an IBM-compatible computer/data processing system equipped to run the MICROSOFT WINDOWS NT SERVER operating system. Alternatively, central trouble ticket data storage facility 202 may be implemented using a UNIX-based data processing system such as a SUN SPARC 1000 computing system which is manufactured by SUN MICROSYSTEMS, INC. Preferably, such a system supports database operations facilitated using an SQL capable server-side database management system such as the MICROSOFT SQL-SERVER package which is manufactured and marketed by MICROSOFT CORPORATION, the ORACLE RELATIONAL DATABASE MANAGEMENT SYSTEM 7 which is manufactured by ORACLE CORPORATION, etc. The implementation of such operating systems and database management systems to provide an SQL addressable network database server to implement central trouble ticket data storage facility 202 will be readily understood by those skilled in the art. The ability to centrally store and query trouble ticket and other similar customer support type data in central trouble ticket data storage facility 202 according to the present invention is further illustrated in FIGS. 3–6 which are described in detail below.

In the foregoing discussions, the terms MICROSOFT, WINDOWS, NT, and ACCESS 97 are trademarks of and may be registered to MICROSOFT CORPORATION. Additionally, the terms ORACLE and SYSTEM 7 are trademarks of and may be federally registered to ORACLE CORPORATION.

The preferred embodiment of the present invention depicted in FIG. 2, allows central storage of trouble ticket and customer inquiry related information so as to facilitate remote access by various data processing systems in a particular data processing environment. Such data processing systems may be part of a single organization such as organization 100 as shown or may be associated with multiple organizations all storing centralized trouble ticket and customer inquiry information in central trouble ticket data storage facility 202. Central data storage facility 202 records and stores fielded data corresponding to trouble ticket information that may be gathered by help-desk and other support personnel, etc. Such a fielded data scheme is illustrated in regard to FIG. 4 which is discussed in detail below.

Referring now to FIG. 3, depicted therein is an exemplary trouble ticket/customer support inquiry that is used to from the basis of the database(s) (and tables) stored in central trouble ticket data storage facility 202 according to a preferred embodiment of the present invention. In particular, trouble ticket 300 corresponds to a call center trouble ticket and has a trouble ticket number of OH00076747 (310) which has been identified as relating to a call/customer service request of severity level 3 (312) (e.g., corresponding to severity levels for a particular call center, help-desk facility, etc.), a short description (314) identifying the nature of the call being handled relative to trouble ticket (300) (e.g., a request for information for a particular software application or subsystem thereof, etc.), a call type (313) generally identifying what the ticket regards, a resolution code (315, blank) which may be an acronym indicative of the level of completion of addressing the ticketed problem an event log (316) containing notes recorded by call center/help-desk or other responsible personnel, and a status indicator (318). Other and/or additional data may be included within a call center trouble ticket; thus the present invention is not limited by the data shown in trouble ticket 300 or which is discussed herein. For example, date related information (e.g., date of trouble ticket/customer service request initiation, date of corresponding completion, etc.) may be included as fielded data within table 400 as shown below.

Referring now to FIG. 4, depicted therein is a database table structure having columns and rows corresponding to fielded data stored in relation to trouble ticket and customer inquiry requests and inquiries received via data processing systems and which are stored in central trouble ticket data storage facility 202 (FIG. 1). In particular, an exemplary database table 400 illustrates the various fields (columns) that correspond to trouble ticket (300) (FIG. 3) and the contents thereof and represents a common data storage scheme by which to store trouble ticket data in accordance with a preferred embodiment of the present invention. Accordingly, table (400) represents a common data storage scheme that allows central storage of uniformly formatted data to facilitate queries against the same by multiple data processing systems in the aforementioned data processing environment.

More particularly, table (400) includes a trouble ticket number column (410), a severity level column (412), a Call/Ticket type column (414), a resolution code column (416), a short description column (418), an event log text column (420) containing free flowing text related to the handling of a particular customer service inquiry and/or trouble ticket, a status column (422), and a host of other specific columns that may be included to suit particular design requirements (424) such as data type. Accordingly, the ellipses contained or shown within table (400) are intended to indicate that additional data (e.g., date type data, etc.) may be stored therein. The entries shown within row 1 of table 400 directly correspond to the entries found within trouble ticket 300 as shown in FIG. 3. As shown, the trouble ticket number is depicted as OH00076747 (310, FIG. 3), severity level is depicted as 3 (312, FIG. 3), etc.

The structures described above with regard to FIGS. 24 are intended to operate together to facilitate the central storage of trouble ticket data including archived type trouble ticket and customer inquiry data in central trouble ticket data storage facility 202 (FIG. 1). As noted above, such structures are designed to operate together in accordance with client and server software systems to facilitate database operations and statistical analysis of the same via a graphical user interface to facilitate both querying and statistical reporting against such data. The operations to facilitate such functionality are illustrated in FIGS. 5A and 5B to which reference is now made.

Figure 5A:
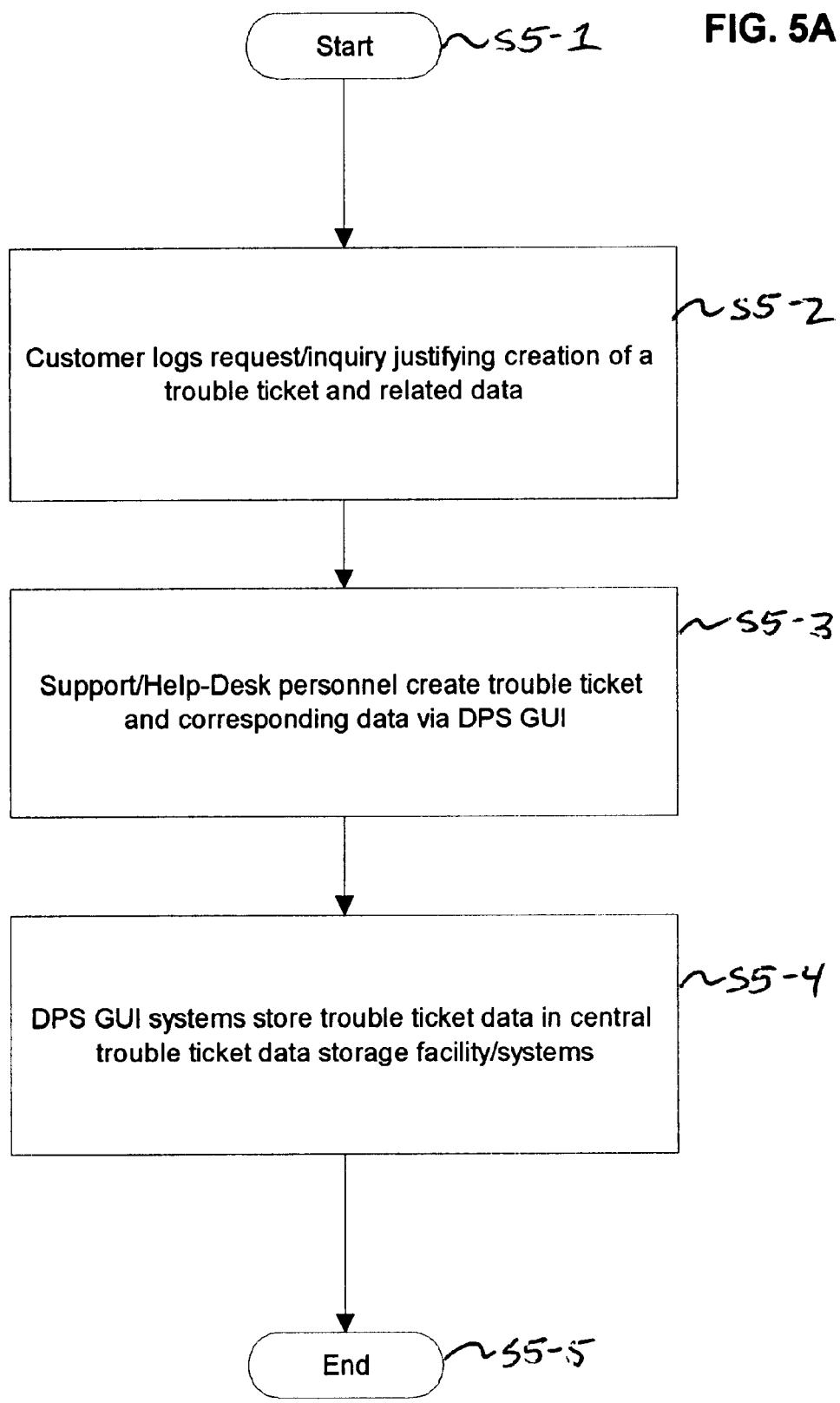
FIG. 5A is a flowchart that illustrates a sample process that may be deployed to facilitate ticketing and tracking of customer support inquiries according to a preferred embodiment of the present invention.
Figure 5B:
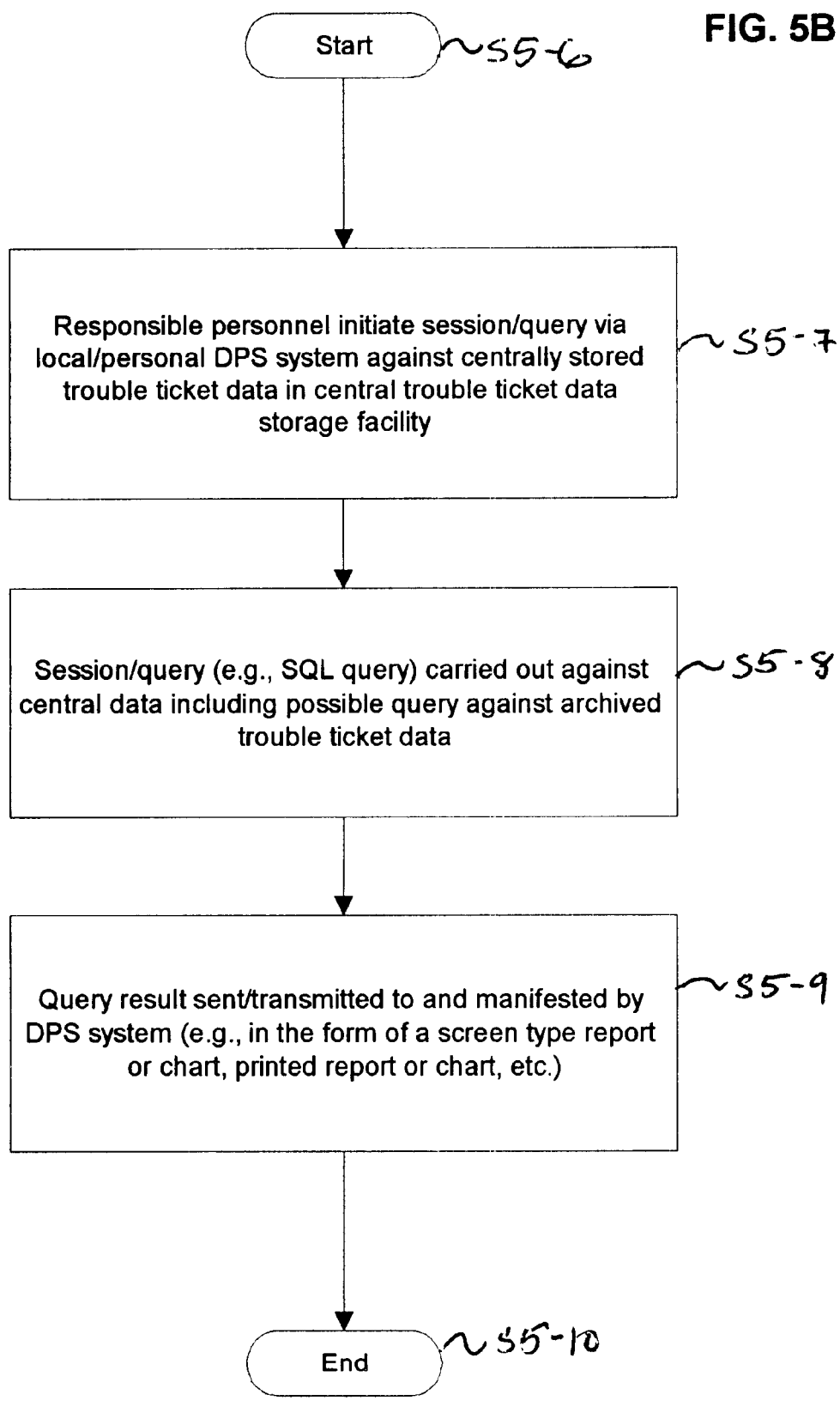
FIG. 5B is a flowchart that illustrates a sample process that may be deployed to facilitate trend analysis through data query processing according to a preferred embodiment of the present invention.

Referring now to FIG. 5A, depicted therein is a flowchart that illustrates the operations that may be carried out within system 200 (FIG. 2) to facilitate the storage of trouble ticket data via a graphical user interface operating a remotely located data processing system such as system 204 in accordance with a preferred embodiment of the present invention. In particular, processing starts at step S5-1 and immediately proceeds to step S5-2. At step S5-2, a customer logs a request justifying creation of trouble ticket and corresponding trouble ticket and customer inquiry information and data.

Next, at step S5-3, support/help desk personnel create a trouble ticket and corresponding data via a data processing system graphical user interface such as one implemented via a data entry form established in MICROSOFT ACCESS 97 running on data processing system 204.

Next, at step S5-4, a data processing system graphical user interface system stores the generated trouble ticket data in central trouble ticket data storage facility 202 (FIG. 2) such as via a network connection, etc. Such trouble ticket data will be stored in accordance with a fielded structure identified above and illustrated in regard to FIG. 4.

Processing and operations end at step S5-5.

Referring now to FIG. 5B, depicted therein is a flow chart that illustrates operations that may be carried out within system 200 to facilitate querying and statistical reporting related to trouble ticket data including archived trouble ticket data in accordance with the preferred embodiment of the present invention. In particular, processing and operations start at step S5-6 and immediately proceed to step S5-7.

At step S5-7, responsible personnel initiate a session/query via a data processing system such as DPS 204 (FIG. 2) against centrally stored trouble ticket and customer inquiry data stored in central data storage facility 202. Such a query may take the form of a MICROSOFT ACCESS 97 query that has been pre-coded and which may be launched via a graphical user interface. Alternatively, such a query may be custom generated on-the-fly via a query and report generator provided by MICROSOFT ACCESS 97 or other client-side database management systems. In any case, the generated query may drive an SQL type query that is to be carried out against tables stored in central trouble ticket data storage facility 202 (FIG. 2).

Next, at step S5-8, the session and query are carried out against data stored within central trouble ticket data storage facility 202 (FIG. 2) via an SQL query, etc., including a possible query against archived data. Such an SQL query may be implemented as an appropriate SQL SELECT statement such as a SELECT . . . <DATE>. . . <BETWEEN>. . . statement/instruction issued against the fields/columns contained within table 400 (FIG. 4).

Next, at step S5-9, query results are received by a DPS system such as DPS system 204 and are manifested thereby such as in the form of a printed report or screen based report/chart which may include graphics and the like depicting statistical information.

The process then ends at step 510.

Figure 6:
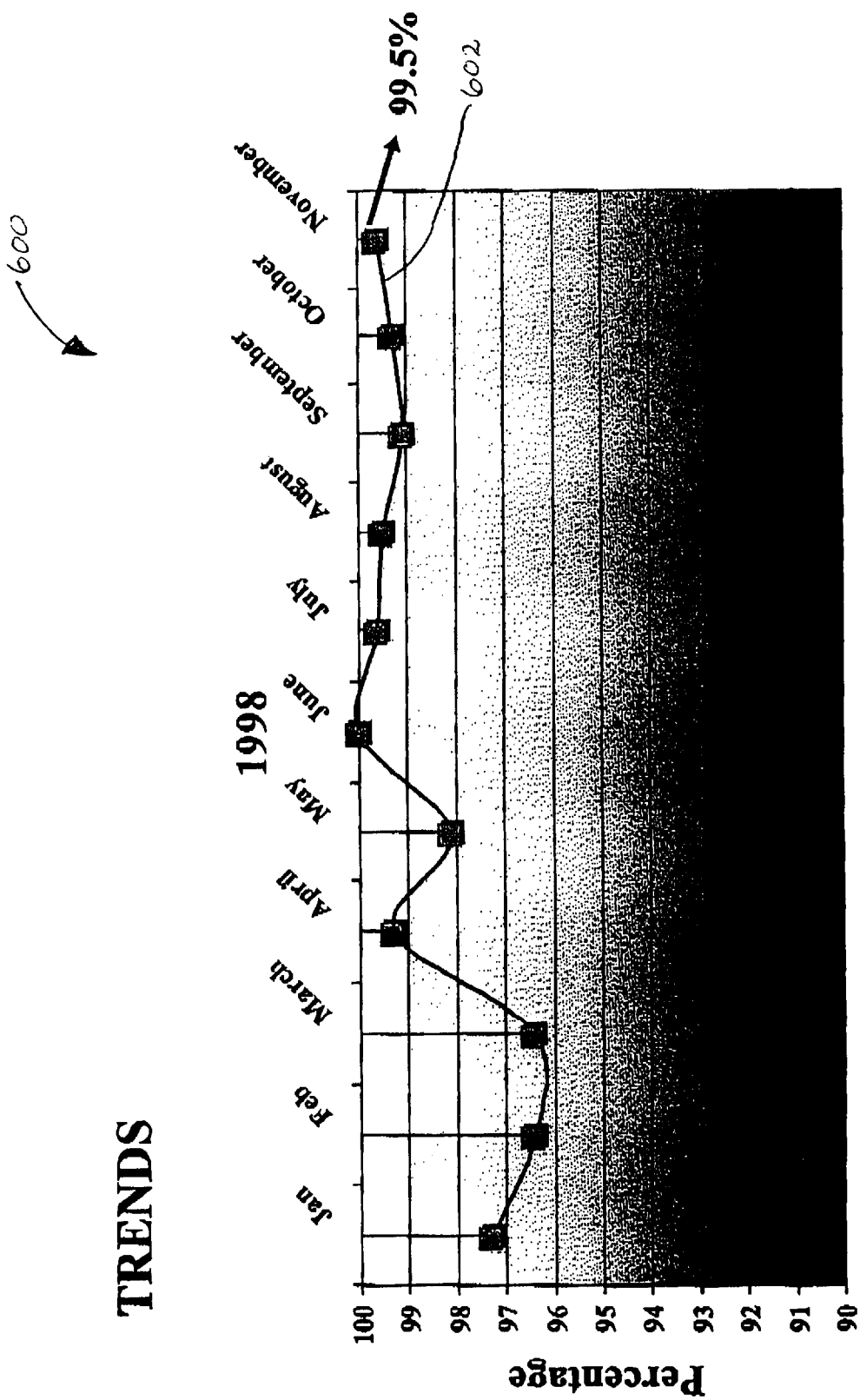
FIG. 6 is a chart that illustrates trending analysis operations and outputs that may be performed and generated, respectively by the present invention to graphically depict trouble ticket/customer support inquiry resolution percentages according to a preferred embodiment of the present invention.

Referring now to FIG. 6, depicted therein is a graphical output resulting from a query and one that represents statistical information related to centrally stored trouble ticket data within central trouble ticket data storage facility 202 (FIG. 2) according to a preferred embodiment of the present invention. In particular, a graph 600 relates to trouble ticket trends and, in particular, to trouble tickets that were completed within a particular period of time. That is, an operator at a DPS such as DPS 104 may request a report to show the percentages of trouble tickets and customer service inquiries (like that shown in FIG. 3) which are initiated and completed within a particular month of a given year. Such a graphical representation may be keyed off of a resolution code as indicated in table 400 (FIG. 4). Accordingly, a line graph 602 may be produced to graphically illustrate the relative percentages over time which may include a representation of archived data. Accordingly, management personnel and customers may utilize a graph generated in accordance with the present invention and one like or similar to graph 600 to allocate resources and to understand how particular trouble tickets are being handled and processed.

For example, as chart 600 shows, the organization providing response to customer service inquiries improved performance from June 1998 until November 1998 as compared to the performance within the first five months of 1998. Management organizations/personnel and customers will be able to graphically review statistical trends against centrally and consolidated data sources including the review of archived data (stored according to a common data storage scheme) over prior periods of time to facilitate views of performance.

Accordingly, the present invention now allows ticketing, trending, and tracking of customer service inquiries and other trouble related inquiries over relatively wide periods of time and against centrally stored fielded and uniformly formatted data utilizing technologies that allow effective and efficient deployment and implementation of queries and corresponding outputs.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for managing the collection, trending, and tracking of trouble ticket data within a data processing environment, comprising:

a central data storage facility storing trouble ticket data corresponding to customer support requests according to a common data storage scheme; and a plurality of data processing systems coupled to said central data storage facility via a network system, each data processing system of said plurality of data processing systems configured to facilitate collection, trending, and tracking processes related to said trouble ticket data stored in said central data storage facility via a graphical user interface configured in accordance with said common data storage scheme, said trending processes including statistical processes to analyze attributes of subsets of said trouble ticket data stored by said central data storage facility, wherein the statistical processes include a process to determine percentages of trouble tickets that were completed within particular periods of time.

2. The system according to claim 1, wherein said common data storage scheme includes fielded data requirements for storing said trouble ticket data.

3. The system according to claim 2, wherein said fielded data requirements including specifications for a trouble type field, a status type field, and a response type field.

4. The system according to claim 1, wherein said common data storage scheme includes a relational database file system.

5. The system according to claim 1, wherein each data processing system of said plurality of data processing systems is configured to operate in accordance with a database management system client facility, said database management client facility configured to access a server facility that is configured to query said central data storage facility.

6. The system according to claim 1, wherein said graphical user interface associated with each data processing system of said plurality of data processing systems is configured to issue data queries against said trouble ticket data stored by central data storage facility.

7. The system according to claim 6, wherein said data queries are structured query language (SQL) queries.

8. The system according to claim 1, wherein said central data storage facility stores archived trouble ticket data in a accordance with said common data storage scheme to facilitate seamless processing thereof by said plurality of data processing systems.

9. A method for facilitating the management, collection, trending, and tracking of trouble ticket data within a data processing environment, comprising:

centrally storing trouble ticket data corresponding to customer support inquiries within a central data storage facility according to a common data storage scheme;

collecting said trouble ticket data from a plurality of data processing systems coupled to said central data storage facility, each data processing system of said plurality of data processing systems being outfitted with a graphical user interface configured in accordance with said common data storage scheme;

performing trending analysis operations related to said trouble ticket data in at least one data processing system of said plurality of data processing systems, said trending analysis operations including statistical analysis to produce a summary regarding said trouble ticket data, said statistical analysis including performing percentage calculation regarding said trouble ticket data; and performing tracking processes related to said trouble ticket data stored in said central data storage facility in at least one data processing system of said plurality of data processing systems via said graphical user interface, wherein the percentage calculation produces percentages of trouble tickets that were completed within particular periods of time.

10. The method according to claim 9, wherein said central data storage facility stores archived trouble ticket data and said trending analysis performance step involves analyzing said archived trouble ticket data.

11. The method according to claim 9, wherein said tracking performance step involves establishing at least one archive collection of said trouble ticket data in accordance with said common data storage scheme.

12. The method according to claim 9, wherein said trouble ticket data is centrally stored in database tables having a fielded data structure.

13. A system for managing the collection, trending, and tracking of trouble ticket data within a data processing environment, comprising:

a central data storage facility storing trouble ticket data corresponding to customer support inquiries according to a common data storage scheme maintained among at least one relational database table; and a plurality of data processing systems coupled to said central data storage facility via a network system, each data processing system of said plurality of data processing systems configured to facilitate collection, trending, and tracking processes related to said trouble ticket data stored in said central data storage facility via a graphical user interface configured in accordance with said common data storage scheme maintained among said at least one relational database table, and to generate an output related to said trouble ticket data, said output including a report illustrating statistical trends related to said trouble ticket data, wherein at least one of the statistical trends includes percentages of trouble tickets completed during particular periods of time, the percentages being displayed over a contiguous number of the particular periods of time.

14. The system according to claim 13, wherein said output is a graph depicting statistical trends related to said trouble ticket data.

15. The system according to claim 13, wherein said central data storage facility stores current and archived trouble ticket data according to said common data storage scheme maintained among said at least one relational database table.

16. The system according to claim 13, wherein said trending and tracking processes include statistical operations performed against said trouble ticket data via at least one query generated by a particular data processing system of said plurality of data processing systems and issued against said trouble ticket data centrally stored in said central data storage facility.

17. The system according to claim 13, wherein said graphical user interface associated with each data processing system of said plurality of data processing systems is configured to issue data queries against said trouble ticket data stored by central data storage facility.

* * * * *